(12) United States Patent
Moro (10) Patent No.: US 6,423,950 B2
(45) Date of Patent: Jul. 23, 2002

(54) REFLOW SOLDERING APPARATUS

(75) Inventor: Kyoji Moro, Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 19 days.

(21) Appl. No.: 09/739,963

(22) Filed: Dec. 20, 2000

(30) Foreign Application Priority Data

Dec. 22, 1999 (JP) .......................................... 11-363782

(51) Int. Cl.$^7$ ................................................ H05B 1/02
(52) U.S. Cl. ...................... 219/501; 219/508; 219/497; 219/233; 219/110; 363/98
(58) Field of Search ................................ 219/501, 508, 219/497, 499, 507, 85.1, 110, 230–234; 363/98, 112

(56) References Cited

U.S. PATENT DOCUMENTS 4,224,496 A * 9/1980 Riordan et al. ............. 219/110
6,320,774 B2 * 11/2001 Jochi et al. .................. 363/98
6,326,580 B1 * 12/2001 Hiiro ........................... 219/110

* cited by examiner

Primary Examiner—Mark Paschall
(74) Attorney, Agent, or Firm—Wenderoth, Lind & Ponack, L.L.P.

(57) ABSTRACT

This reflow soldering apparatus comprises a heater tip 10 for soldering sites to be soldered of a workpiece W by reflow method, a power supply unit for supplying an electric power for heat generation or heating to the heater tip, a control unit for providing a control of the supplied current in the power supply unit, and a pressing unit 16 for pressing the heater tip against the sites to be soldered of the workpiece W. An inverter of the power supply unit has four transistor switching elements. By the control unit by way of a driving circuit, the first set of switching elements and are simultaneously switching (ON/OFF) controlled at a predetermined inverter frequency (e.g., 10 kHz) in response to in-phase inverter control signals $G_1$ and $G_3$, whereas the second set of switching elements are simultaneously switching controlled at the inverter frequency in response to in-phase inverter control signals $G_2$ and $G_4$.

3 Claims, 7 Drawing Sheets

FIG.6A (AC CURRENT APPLIED)

FIG.6B (DC CURRENT APPLIED)

REFLOW SOLDERING APPARATUS

BACKGROUND OF THE INVENTION

1. Field of the Invention

The present invention relates generally to a reflow soldering, and more particularly, to a technique for performing soldering by use of a heater tip.

2. Description of the Related Art

The reflow soldering is a technique for effecting a metal-to-metal joining by melting a solder through heating, the solder being interposed between soldered sites of metal members to be joined together. The reflow soldering has hitherto widely used in fabrication, mounting, etc., of electronic components.

Figure 7:
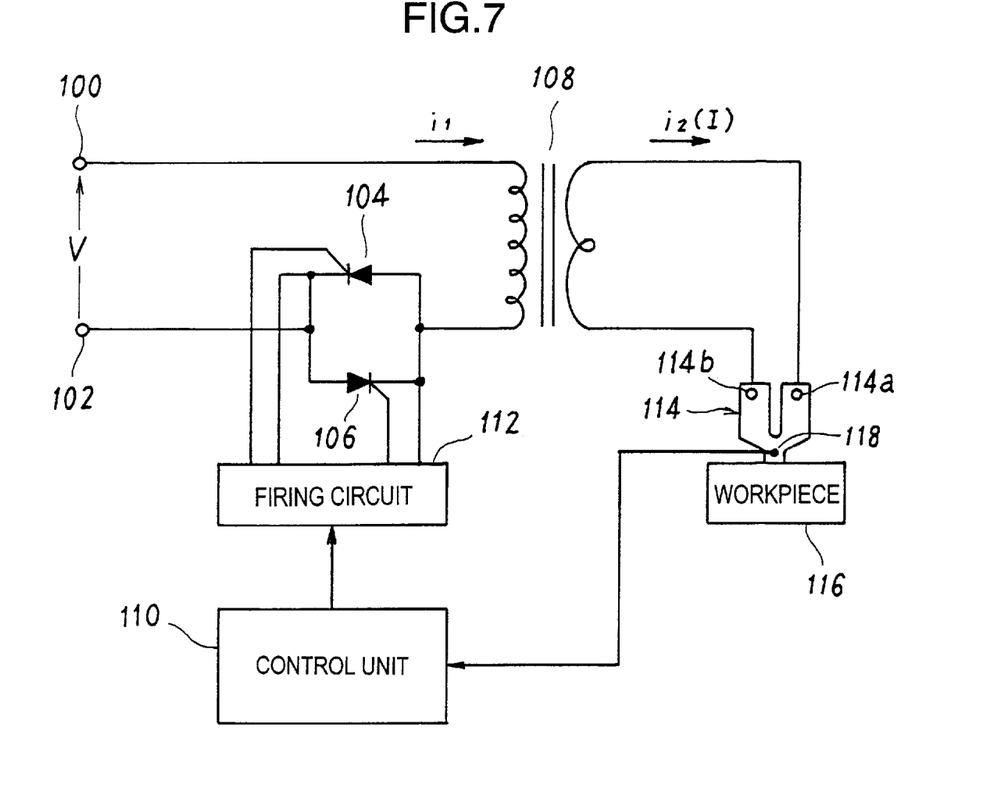
FIG. 7 is a block diagram showing the configuration of a conventional reflow soldering apparatus.

A conventional reflow soldering apparatus using a heater tip as its heating means is provided with a single-phase AC power supply as shown in FIG. 7. In this power supply, a single-phase AC voltage V of a commercial frequency applied to input terminals 100 and 102 are fed via a contactor consisting of a pair of thyristors 104 and 106 to a primary coil of a step-down transformer 108. An AC induced electromotive force (secondary voltage) occurring at the secondary coil of the transformer 108 is applied via a secondary conductor to terminals 114a and 114b of a heater tip 114, so that a secondary current $i_2$ having a larger current value than that of a primary current $i_1$ flows as a supplied current I for heating heater tip through the secondary circuit.

When supplied with the current, the heater tip 114 generates heat as a result of resistance heating, and via its point, applies pressure and heat to the sites to be soldered of the workpiece 116. Cream solder is applied in advance onto joint areas of the sites to be soldered and melts under the action of the pressure and heat from the heater tip 114. Upon the elapse of a given time the current supply is ceased and then the pressure is also released. As a result, the solder solidifies to physically and electrically join the sites to be soldered of the workpiece 116 together by way of the solidified solder.

Figure 8:
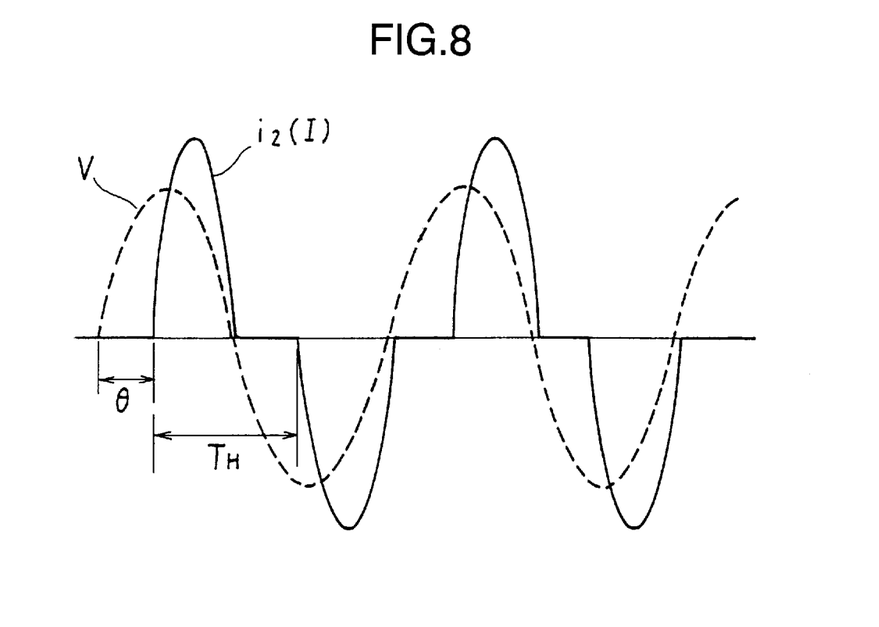
FIG. 8 is a diagram showing the current control method effected in the conventional reflow soldering apparatus.

The magnitude (effective value) of the supplied current I is determined by the conduction angle. However, a substantially constant relationship lies between the firing angle and the conduction angle, and hence it may be said that the magnitude of the supplied current I is determined by the firing angle. In this power supply, the temperature at the point of the heater tip 114 is detected by a temperature sensor 118 comprised of a thermocouple for example. In order to allow the detected temperature (heater tip temperature) to be coincident with a set temperature, the control unit 110 determines a firing angle θ at every half cycle (see FIG. 8) so that the thyristors 104 and 106 are fired (turned on) at the firing angle θ by way of a firing circuit 112.

Figure 9:
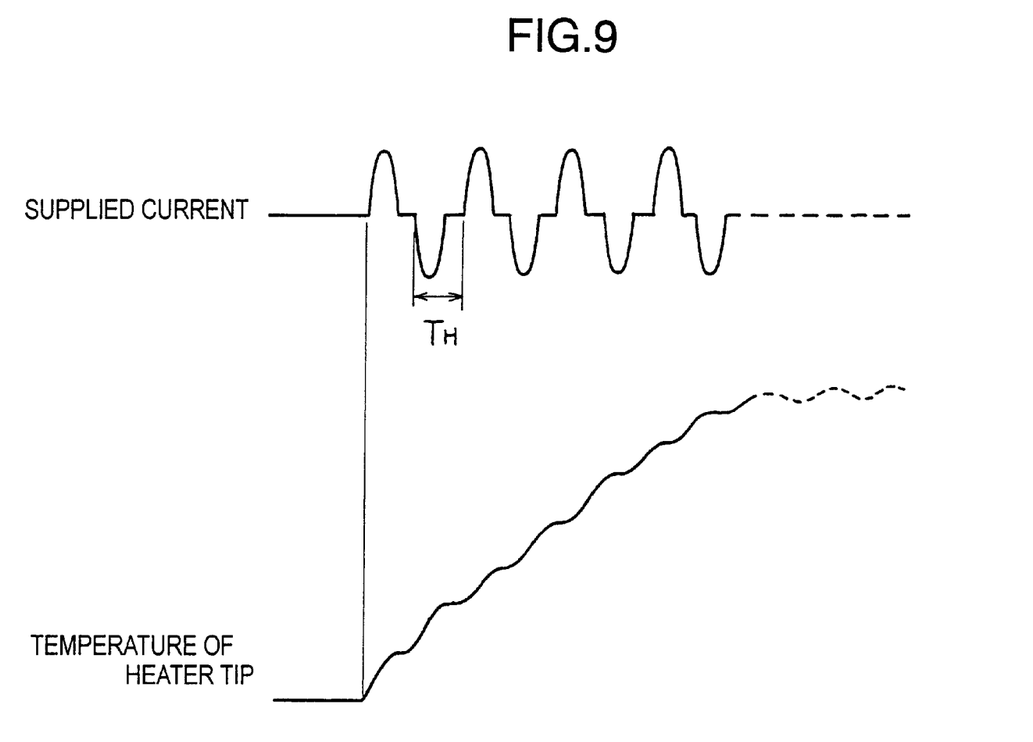
FIG. 9 shows the rise characteristics of the heater tip temperature in the conventional reflow soldering apparatus.

The conventional reflow soldering apparatus using such a single-phase AC power supply has employed the current-supplying control in which the temperature feedback is performed at a considerably long cycle time $T_H$ in the field of electronic control, as much as the half cycle (10 ms or 8.33 ms) of the commercial frequency (50 Hz or 0 Hz), which has made it difficult to cause the heater tip temperature to rapidly and precisely coincide with the set temperature. As is apparent from FIG. 8, the supplied current I has a distorted waveform derived from the phase control of a sinusoidal wave and further has a quiescent time at every half cycle of the commercial frequency, so that the heater tip temperature may undergo a large ripple and especially upon the rise, a stepwise temperature rise may appear as shown in FIG. 9, resulting in unstable temperature characteristics.

Furthermore, workpieces like microelectronic components are recently prevailing which require metal-to-metal bonding presenting a high reliability in a brief process time less than several tens of milliseconds. It would be difficult for the conventional reflow soldering apparatus to deal with such workpieces.

SUMMARY OF THE INVENTION

The present invention was conceived in view of the above problems. It is therefore an object of the present invention to provide a reflow soldering apparatus having an improved heater tip temperature control.

Another object of the present invention is to provide a reflow soldering apparatus capable of rapidly and precisely controlling the temperature of the heater tip.

A further object of the present invention is to provide a reflow soldering apparatus capable of effecting a high reliable soldering regardless of a short process time.

In order to attain the above objects, according to an aspect of the present invention there is provided a reflow soldering apparatus comprising a heater tip for generating heat by current supply; pressing means for pressing a point of the heater tip against sites to be soldered, for pressing over a predetermined pressing time; a rectifying circuit for rectifying an AC voltage of a commercial frequency into a DC voltage; an inverter for converting the DC voltage output from the rectifying circuit into a pulsed voltage of a high frequency; a transformer having primary side terminals electrically connected to output terminals of the inverter, the transformer having secondary side terminals electrically connected to terminals of the heater tip without intervention of any rectifying circuit; and inverter control means for segmenting a current-supplying time defined in the predetermined pressing time into a plurality of current-supplying periods, the inverter control means providing a control of switching operations of the inverter such that in odd-numbered current-supplying periods the inverter issues the high-frequency pulse with one polarity and such that in even-numbered current-supplying periods the inverter issues the high-frequency pulse with the other polarity.

In the present invention, the heater tip accepts a supplied current whose waveform has been controlled at a high-frequency cycle by the inverter, with the result that a higher heat-generating efficiency of the heater tip is ensured so that the solder can rapidly melt in a brief period of time to securely achieve a desired soldering.

To achieve a more precise and stable temperature control in the reflow soldering apparatus of the present invention, preferably the apparatus further comprises temperature detecting means for detecting the temperature of the vicinity of the point of the heater tip, and the inverter control means provide a control of switching operations of the inverter such that a detected temperature from the temperature detecting means is fedback at every any desired cycles of the high frequency so as to allow the detected temperature to coincide with a set temperature.

To achieve the above more precise and stable temperature control and to achieve a more rapid and stable temperature rise of the heater tip in the reflow soldering apparatus of the present invention, preferably, the apparatus further comprises temperature detecting means for detecting the temperature of the vicinity of the point of the heater tip; and current measuring means for measuring the current on the primary side or secondary side of the transformer. The inverter control means may provide a control of switching operations of the inverter such that a measured current from the current measuring means is fedback immediately after the start of current supply in the current-supplying time so as to allow the measured current to coincide with a set current, the inverter control means monitoring a detected temperature obtained from the temperature detecting means to provide a control of switching operations of the inverter such that a detected temperature from the temperature detecting means is fedback after the detected temperature reaches a set temperature or a predetermined temperature in the vicinity of the set temperature so as to allow the detected temperature to coincide with the set temperature.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

Referring to FIGS. 1 to 6, an embodiment of the present invention will now be described.

Figure 1:
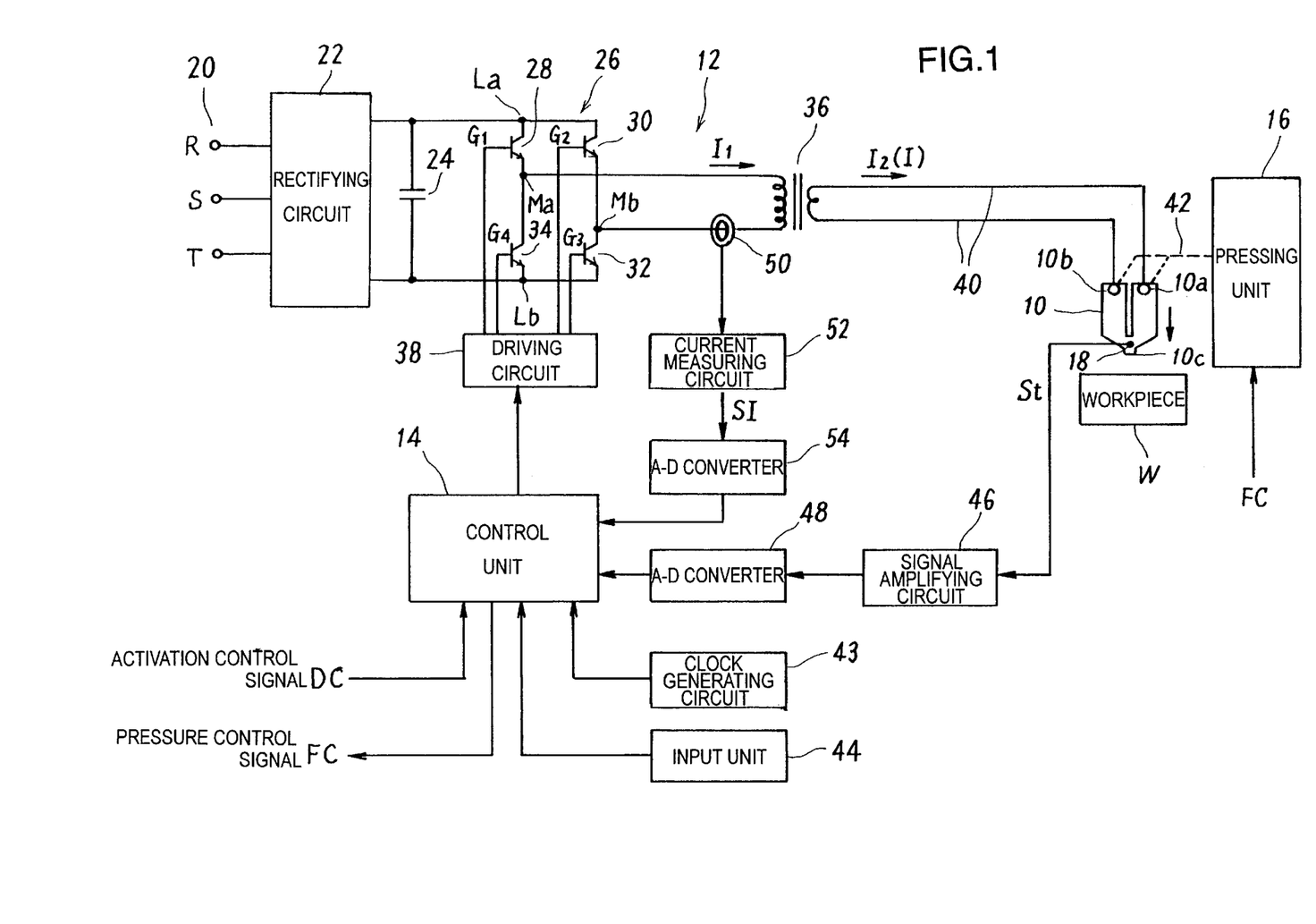
FIG. 1 is a block diagram showing the configuration of a reflow soldering apparatus in accordance with an embodiment of the present invention.

FIG. 1 shows the configuration of a reflow soldering apparatus in accordance with an embodiment of the present invention.

The reflow soldering apparatus comprises a heater tip 10 for soldering a site to be soldered of a workpiece W by the reflow method, a power supply unit 12 for supplying a heat-generating or heating electric power to the heater tip 10, a control unit 14 for providing a control of the supplied current in this power supply unit 12, and a pressing unit 16 for pressing the heater tip 10 against the site to be soldered of the workpiece W, for pressing.

The power supply unit 12 includes a three-phase rectifying circuit 22, an inverter 26 and a step-down transformer 36. The three-phase rectifying circuit 22 consists of, e.g., six diodes that are three-phase bridge connected and full-wave rectifies three-phase AC voltage (R, S, T) of a commercial frequency input from a three-phase AC power supply terminals 20, into a DC voltage. The DC voltage output from the three-phase rectifying circuit 22 is smoothed by a capacitor 24 and fed to input terminals [La, Lb] of the inverter 26.

The inverter 26 has four transistor switching elements 28, 30, 32 and 34 comprised of, e.g., GTRs (giant transistors) or IGBTs (insulated gate bipolar transistors).

Of the four switching elements 28 to 34, a first set of (positive side) switching elements 28 and 32 are simultaneously switching (ON/OFF) controlled at a predetermined inverter frequency (e.g., 1 kHz) by in-phase inverter control signals $G_1$ and $G_3$ fed via a driving circuit 38 from the control unit 14, whereas a second set of (negative side) switching elements 30 and 34 are simultaneously switching controlled at the above inverter frequency by in-phase inverter control signals $G_2$ and $G_4$ fed via the driving circuit 38 from the control unit 14.

The inverter 26 has output terminals [Ma, Mb] that are connected respectively to opposed ends of the primary coil of the transformer 36. To opposed ends of the secondary coil of the transformer 36 are connected two terminals 10a and 10b of the heater tip 10 by way of only a secondary conductor 40 without intervention of any rectifying circuit.

The heater tip 10 is formed of a high heat-generative metal resistor, e.g., molybdenum and generates heat by resistance heating when a current flows between the terminals 10a and 10b. A thermocouple 18 is fitted as a temperature sensor to the vicinity, e.g. side surface of a point 10c of the heater tip 10, the thermocouple 18 issuing electric signals (temperature detection signals) $S_t$ indicative of the temperature in the proximity to the point 10c.

The heater tip 10 is removably fitted to a chip support member 42 of the pressing unit 16. The pressing unit 16 incorporates a pressing drive unit not shown having an air cylinder for example and drives the tip support member 42 in response to a pressure control signal FC from the control unit 14 so as to press the heater tip 10 against the workpiece W for pressing.

The control unit 14 is comprised of a microcomputer which includes a CPU, a ROM (program memory), a RAM (data memory), an interface circuit, etc. The control unit 14 provides all the controls within this apparatus such as pressure control and current-supplying control (especially, inverter control) in the soldering process and makes setting input and entry management associated with set values of various conditions. The control unit 14 further has a function to provide control, such as output control of measured values, judged values, etc., as needed. A clock generating circuit 43 sends to the control unit 14 a clock signal defining the basic or unit cycle for the switching control of the inverter 26.

An input unit 44 is comprised of input devices such as a keyboard and a mouse and is used for setting input of various conditions for soldering process. Major conditions set and input in this embodiment include pressing time $T_f$, current-supplying time (HEAT) $T_G$, current-supplying period $T_A$, temperature set value $J_C$ and current set value $I_C$.

Of these soldering conditions, the pressing time $T_f$ is the total time of a pressing operation from the start of the pressing drive up to the release of the pressure. The current-supplying time (HEAT) $T_G$ is the total current-supplying time from the start of the current supply to the heater tip 10 up to the end thereof and is set within the pressing time $T_f$. Of the pressing time $T_f$, the times before and after the current-supplying time (HEAT) $T_G$ are initial squeeze time (SQ) and hold time (HOLD), respectively.

More specifically, the current-supplying time $T_G$ can be defined as the number of cycles (selectable to any desired value depending on the soldering specifications of the workpiece W) which is integer multiples of the current-supplying period $T_A$ being a half cycle. The current-supplying period $T_A$ is a single independent current-supplying period during which the inverter 26 continually performs switching operations on the positive side or the negative side, and can be set to the period of the order of 100 ms to 200 ms for example.

The temperature set value $J_c$ is used in the constant-temperature control for soldering the workpiece W at a desired heating temperature. The current set value $I_c$ is used in the constant-current control for raising the temperature of the heater tip 10 up to the set temperature $J_c$ or its vicinity most rapidly and stably immediately after the start of the current supply.

In this soldering apparatus, to perform the temperature feedback in the above constant-temperature control, a signal amplifying circuit 46 amplifies an analog temperature detection signal $S_t$ from the thermocouple 18 fitted to the heater tip 10, after which the thus amplified analog signal $S_t$ is converted by an A-D (analog-to-digital) converter 48 into a digital signal which in turn is fed to the control unit 14.

To perform the current feedback in the above constant-current control, the primary circuit conductor of the power supply unit 12 is fitted with a current sensor 50 comprised of, e.g., a current transformer. From an output signal of the current sensor 50, a current measuring circuit 52 determines a measured value (e.g., effective value, mean value or peak value) of primary current $I_1$ or second current $I_2$ as an analog current measurement signal $S_I$, which analog signal $S_I$ is converted by an A-D converter 54 into a digital signal and fed to the control unit 14.

Figure 2:
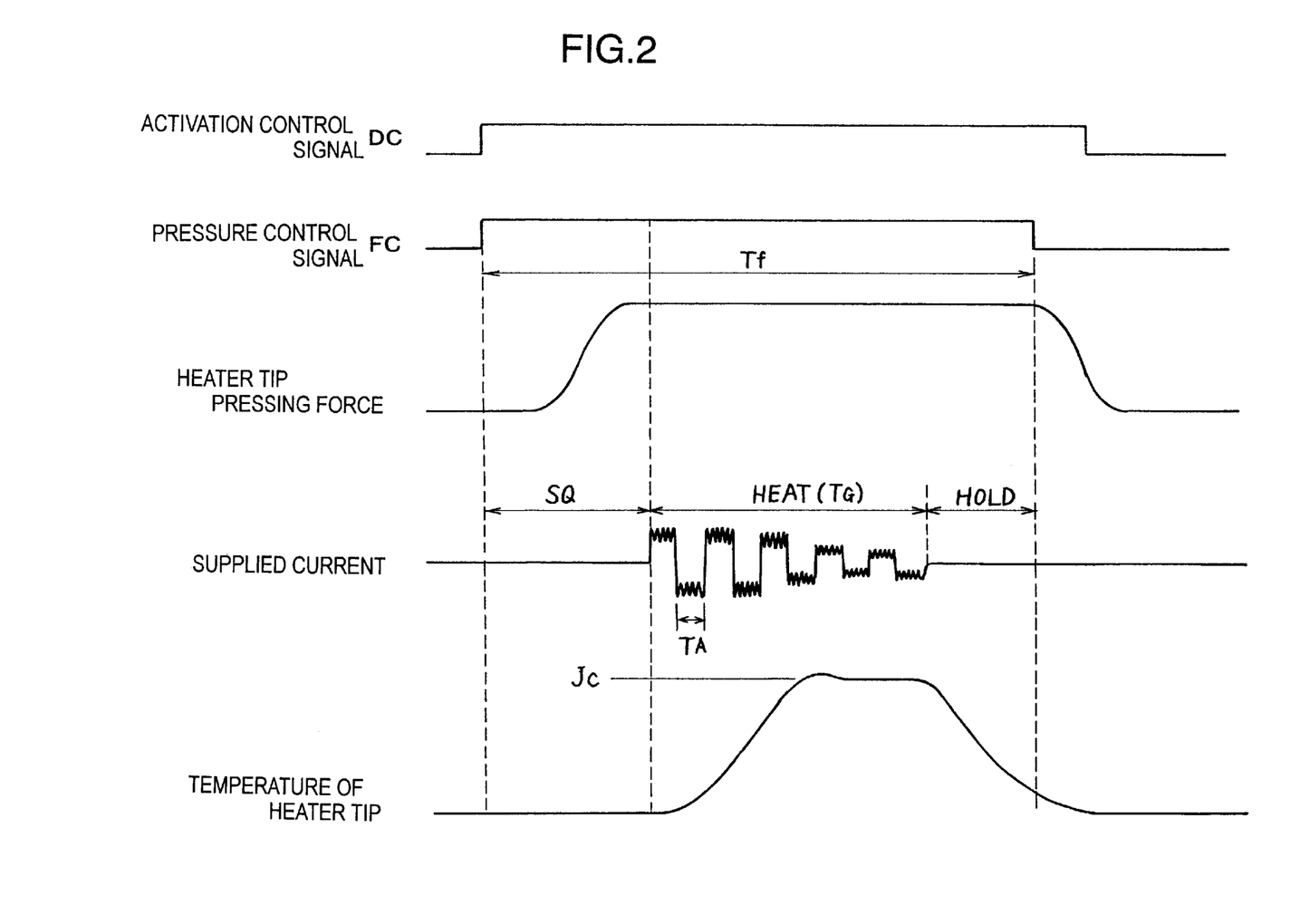
FIG. 2 shows voltage and current waveforms at parts of the reflow soldering apparatus of the embodiment.
Figure 3A:
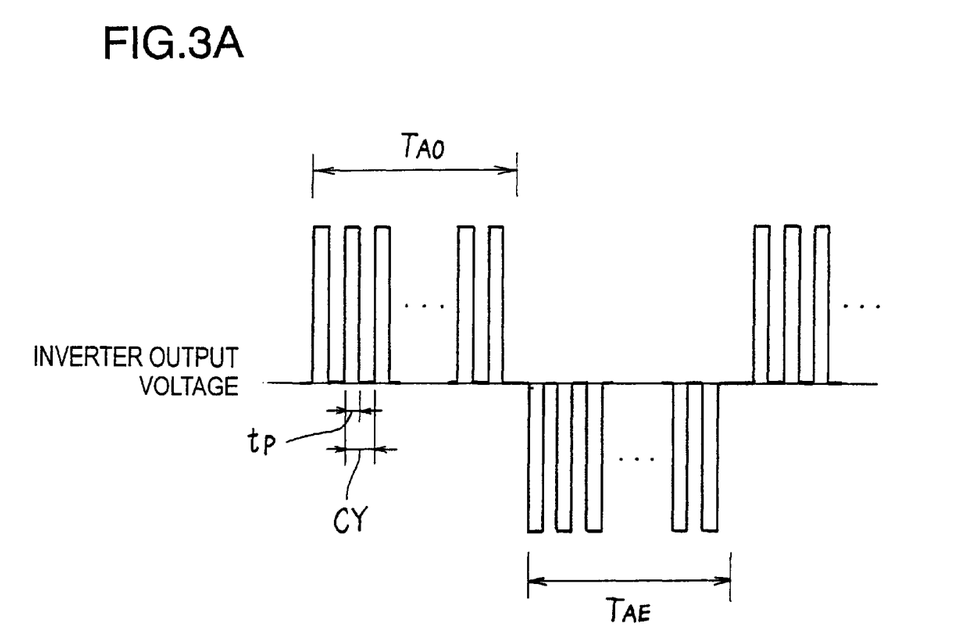
FIGS. 3A and 3B are waveform diagrams at parts showing an inverter control method effected in the embodiment.
Figure 3B:
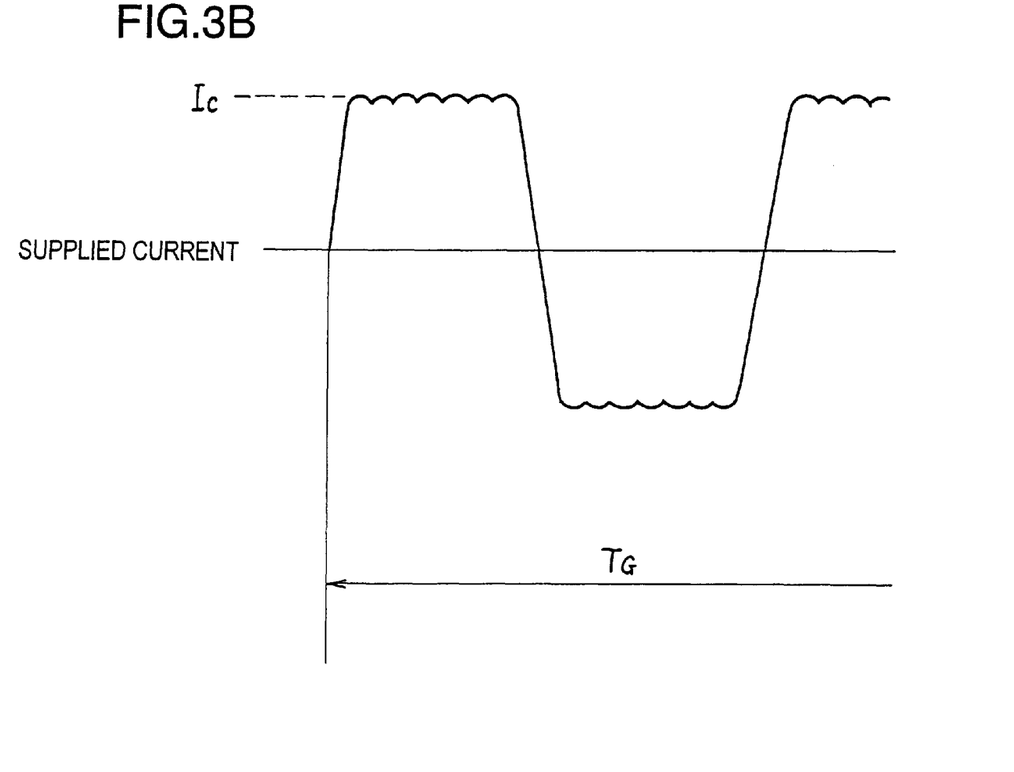
Figure 4:
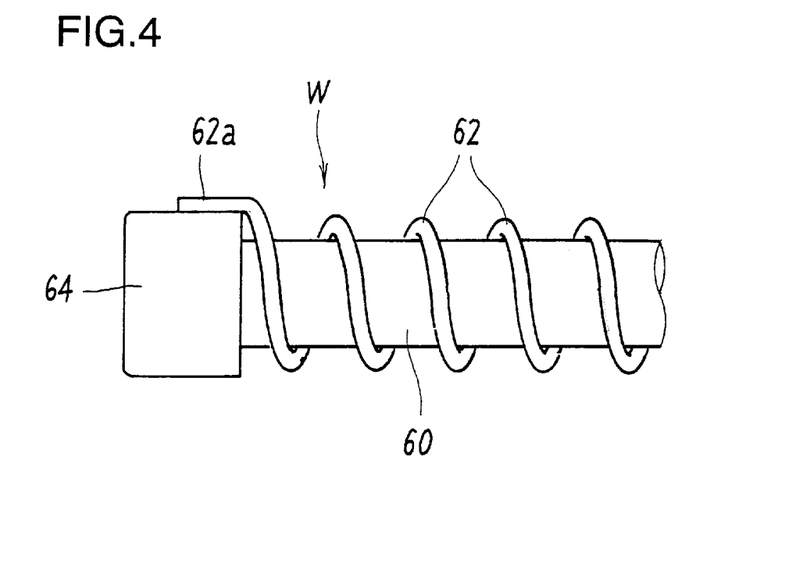
FIG. 4 is a partial side elevational view showing the configuration of a workpiece used in the embodiment.

Referring then to FIGS. 2 to 7, description will be made of the operations and functions of the soldering apparatus. By way of example, the workpiece W is a wound inductor chip (coil) as depicted in FIG. 4. The inductor chip comprises a cylindrical insulator (e. g., ferrite) core 60 around which a conductor wire 62 is spirally wound, with one end 62a of the conductor wire 62 being metal-to-metal joined to one side surface of a block-shaped electrode 64 firmly secured to the end of the core 60. The inductor chip may be a microminiature part of which overall dimension is within several millimeters. In the case of this inductor chip, the inventive reflow soldering apparatus is applicable to the metal-to-metal joining between the conductor wire end 62a and the electrode 64.

Previous to the soldering process, a solder, e.g., a cream solder is applied to the joint surfaces of the conductor wire end 62a and the electrode 64. For the soldering process, the workpiece W is fixedly retained by, e.g., a jig not shown at a predetermined work position on a support not shown.

The instant that the control unit 14 accepts an activation control signal DC (H-level) from an external device not shown, it starts the soldering sequence (see FIG. 2).

Figure 5:
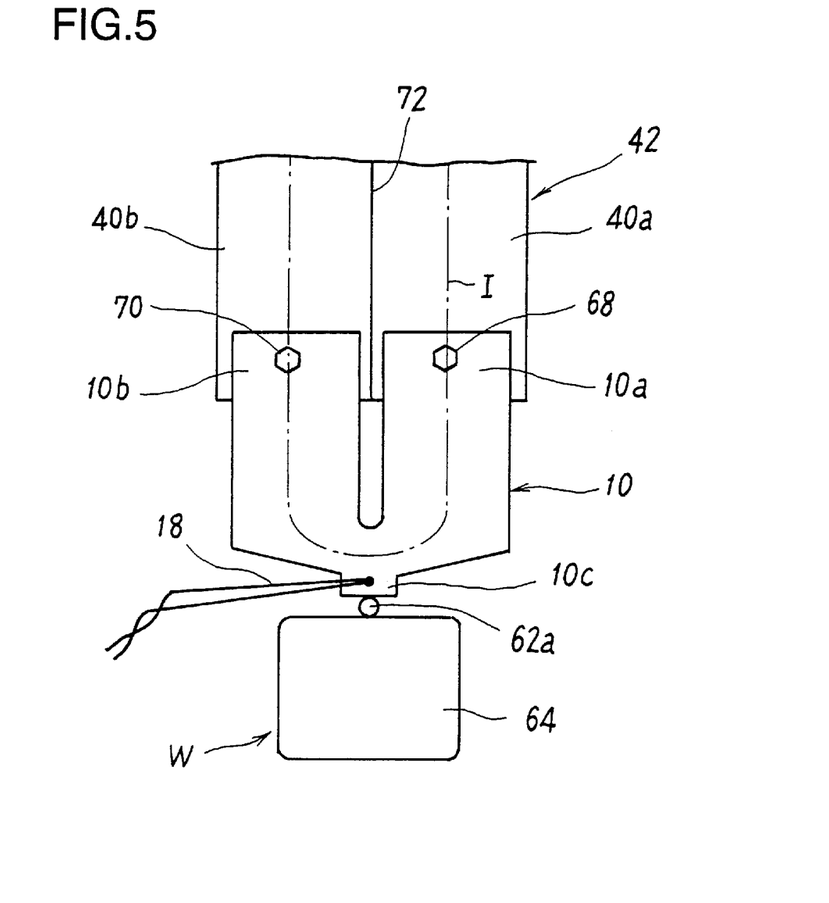
FIG. 5 is a side elevational view showing a heater tip and the workpiece in the process of soldering work in the embodiment.

First, the control unit 14 renders apressure control signal FC active (H-level) to allow the pressing unit 16 to start the pressing operation. As a result, the chip support member 42 lowers to press the point 10c of the heater tip 10 against sites to be soldered (62a, 64) of the workpiece (inductor chip) W, for pressing as shown in FIG. 5. At a predetermined timing after the heater tip pressing force reaches a predetermined value, the power supply unit 12 starts the current supply (see FIG. 2).

Referring to FIG. 5, the tip support member 42 is fastened to the terminals 10a and 10b of the heater tip 10 by means of bolts 68 and 70, respectively, and has a lower end portion made of an electrically conductive material, e.g., copper so as to form part of the secondary conductor 40 of the power supply unit 12. Electrically conductive members 40a and 40b at both ends of the secondary conductor 40 are electrically insulated from each other by an insulating material 72.

In odd-numbered current-supplying periods $T_{AO}$ of a plurality of current-supplying periods $T_A$ constituting the total current-supplying time $T_G$, as shown in FIG. 3A, the control unit 14 allows only the first set of (positive side) switching elements 28 and 32 to continuously perform their switching operations at the inverter frequency while keeping the second set of (negative side) switching elements 30 and 34 OFF. On the contrary, in even-numbered current-supplying periods $T_{AE}$, the control unit 14 allows only the second set of (negative side) switching elements 30 and 34 to continuously perform their switching operations at the inverter frequency while keeping the first set of (positive side) switching elements 28 and 32 OFF.

Consequently, through the secondary circuit of the power supply unit 12, as shown in FIG. 3A, the supplied current I, i.e., the secondary current $I_2$ having a substantially trapezoidal current waveform flows toward the positive direction in the odd-numbered current-supplying periods $T_{AO}$ but toward the negative direction in the even-numbered current-supplying periods $T_{AE}$.

In the temperature rise period immediately after the start of the current supply, the control unit 14 selects as a feedback signal a current measurement signal SI from the primary current detection unit (50, 52, 54) and provides a variable control of the output pulse width tp (i.e., the pulse width of the inverter control signals $G_1$ to $G_4$) of the inverter 26 at every unit cycle CY of the inverter frequency under the PWM (pulse width modulation) control for example so as to allow the current measurement signal SI to coincide with the current set value $I_C$ (see FIG. 3B). This constant-current control allows the current value of the upper side of the trapezoidal current waveform of the supplied current I to come to or near the set value $I_C$.

Thus, the current supply or heating of the heater tip 10 is controlled by the high-speed feedback constant-current control using the inverter 26 so that the temperature of the heater tip 10 (the point 10c in particular) can promptly and stably rise in a linear fashion (see FIG. 2).

For the duration of the above constant-current control, the control unit 14 monitors a temperature detection signal $S_t$ from the tip temperature detection unit (18, 46, 48). Then, when the temperature detection signal $S_t$ reaches the temperature set value $J_c$ or a value in the vicinity thereof, the control unit 14 interrupts or terminates the above constant-current control, but instead starts the constant-temperature control for keeping the temperature detection signal $S_t$ at or near the set value $J_C$ using the temperature detection signal $S_t$ as the feedback signal.

In this constant-temperature control, the output pulse width tp (i.e., the pulse width of the inverter control signals $G_1$ to $G_4$) of the inverter 26 is variably controlled at every unit cycle CY of the inverter frequency under the PWM control so as to allow the temperature control signal $S_t$ to coincide with the set value $J_c$. In consequence, the current-supplying control is effected which suppresses or reduces the supplied current I to cancel the temperature rise arising from accumulation effect of the heat in the heater tip 10 (see FIG. 2), with the result the temperature of the heater tip 10 is kept at or near the set value $J_c$.

By virtue of heating by the heater tip 10 having a good rise-up performance and controlled to a desired temperature, the cream solder can rapidly and appropriately melt at the sites (62a, 64) to be soldered of the workpiece (inductor chip) W.

Upon the elapse of the current-supplying time $T_G$ after the start of the current supply, the control unit 14 brings the inverter 26 to a full stop to terminate the current supply in the power supply unit 12. Then, after the elapse of the hold time (HOLD), the control unit 14 ceases (lowers to L-level) the pressure control signal FC to the pressing unit 16 to thereby release the press or abutment of the heater tip 10 against the workpiece W. On the workpiece (inductor chip) W the solder becomes solidified, with the result that the conductor wire end 62a and the electrode 64 are joined together in a physically and electrically secure fashion by way of the solidified solder.

This reflow soldering apparatus feeds to the heater tip 10 a trapezoidal waveform supplied current I as the current supplied for the heater tip heating, so that the reflow soldering meeting desired requirements can be effected in a short current-supplying time with a high power-supplying efficiency and a high heat-generating efficiency. In addition, due to the precise feedback control at a much higher frequency (e.g., 1 kHz) than the commercial frequency (50/60 Hz) by use of the inverter 26, the accurate and stabilized heater tip temperature control can be provided with an improved work quality.

Due to its capability to reduce the current-supplying time and hence the total required time for soldering, the inventive reflow soldering apparatus can contribute not only to an improvement of the productivity with the reduced work cycle but also to an extension of life with the suppressed wear and degradation of the heater tip.

This reflow soldering apparatus is provided with the mechanism (50, 52, 54) for feedback of the primary current (secondary current is also possible) in the power supply unit 12, in addition to the mechanism (18, 46, 48) for feedback of the temperature of the heater tip 10, whereby in the temperature rise period immediately after the start of current supply the provision of the constant-current control by the selection of the current feedback ensures a rapid and stable rise of the temperature of the heater tip 10 up to the set level. With the constant-current control provided, the temperature of the heater tip 10 is monitored so that switching is made from the constant-current control to the constant-temperature control the instant that the detected temperature reaches the set temperature or its vicinity, thereby enabling the original temperature control in conformity with the set temperature to be provided in an appropriate manner.

Figure 6A:
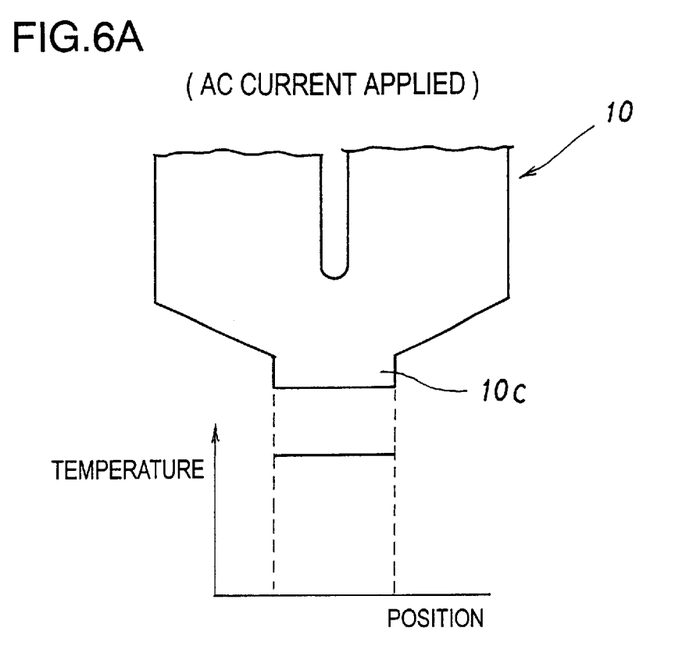
FIGS. 6A and 6B illustrate temperature distribution characteristics at the point of the heater tip, showing the case of using alternating current and direct current, respectively, as the supplied current.

Furthermore, this reflow soldering apparatus allows the polarity (direction) of the supplied current I for heating flowing between the two terminals 10a and 10b in the heater tip 10 to be inverted at a certain cycle (TA) during the current-supplying time $T_G$, so that the temperature of the point is evened or uniformed as shown in FIG. 6A. Heating of soldered sites by the point 10c having such a uniform temperature assures a high reliability of the metal-to-metal joining in the reflow soldering.

Figure 6B:
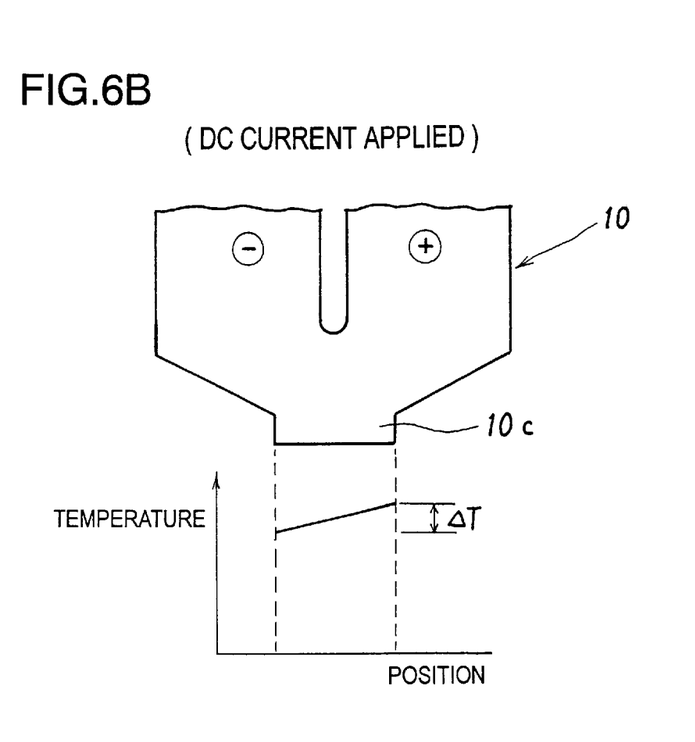

By the way, if the heater tip 10 is supplied with current without inverting the polarity (direction) of the supplied current I, there will arise a temperature gradient ($\Delta T$) between the positive-side site and the negative-side site in the point 10c as shown in FIG. 6B, resulting in an uneven temperature distribution. Application to the soldered sites of the point 10c having such an uneven temperature distribution would result in an unstable solder fusing and hence a lowered reliability of the joint quality.

Although in the above embodiment the three-phase alternating current of the commercial frequency is converted into a direct current for the supply to the inverter 26, the single-phase alternating current may be converted into a direct current. The circuit configuration of the inverter 26 is merely shown by way of example and can variously be modified. The current waveform in each current-supplying period $T_A$ is not limited to the trapezoidal one as in the above embodiment, but it would be possible to control to any desired current waveform by use of, e.g., PWM control. Although the above embodiment has employed the thermocouple for the purpose of detecting the temperature of the heater tip 10, other temperature sensors or temperature detection systems could also be used. The workpiece of FIG. 4 is merely exemplary one, and the present invention would be applicable to any soldering process of the other various workpieces.

According to the reflow soldering apparatus of the present invention, as set forth hereinabove, the temperature of the heater tip can rapidly and precisely be controlled through the improvement in the heater tip temperature control, thereby achieving a high reliable reflow soldering.

While illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A reflow soldering apparatus comprising:

a heater tip for generating heat by current supply;

pressing means for pressing a point of said heater tip against sites to be soldered, for pressing over a predetermined pressing time;

a rectifying circuit for rectifying an AC voltage of a commercial frequency into a DC voltage;

an inverter for converting the DC voltage output from said rectifying circuit into a pulsed voltage of a high frequency;

a transformer having primary side terminals electrically connected to output terminals of said inverter, said transformer having secondary side terminals electrically connected to terminals of said heater tip without intervention of any rectifying circuit; and inverter control means for segmenting a current-supplying time defined in said predetermined pressing time into a plurality of current-supplying periods, said inverter control means providing a control of switching operations of said inverter such that in odd-numbered current-supplying periods said inverter issues said high-frequency pulse with one polarity and such that in even-numbered current-supplying periods said inverter issues said high-frequency pulse with the other polarity.

2. A reflow soldering apparatus according to claim 1, further comprising:

temperature detecting means for detecting the temperature of the vicinity of said point of said heater tip, wherein said inverter control means provide a control of switching operations of said inverter such that a detected temperature from said temperature detecting means is fed back at every any desired cycles of said high frequency so as to allow said detected temperature to coincide with a set temperature.

3. A reflow soldering apparatus according to claim 1, further comprising:

temperature detecting means for detecting the temperature of the vicinity of said point of said heater tip; and current measuring means for measuring the current on the primary side or secondary side of said transformer, wherein said inverter control means provides a control of switching operations of said inverter such that a measured current from said current measuring means is fed back immediately after the start of current supply in said current-supplying time so as to allow said measured current to coincide with a set current, said inverter control means monitoring a detected temperature obtained from said temperature detecting means to provide a control of switching operations of said inverter such that a detected temperature from said temperature detecting means is fed back after said detected temperature reaches a set temperature or a predetermined temperature in the vicinity of said set temperature so as to allow said detected temperature to coincide with said set temperature.

* * * * *